United States Patent
Severinsson

(10) Patent No.: US 6,247,566 B1
(45) Date of Patent: Jun. 19, 2001

(54) TORQUE TRANSMITTING DEVICE

(75) Inventor: Lars Severinsson, Hishult (SE)

(73) Assignee: Westinghouse Air Brake Company, Wilmerding, PA (US)

( * ) Notice: Subject to any disclaimer, the term of this patent is extended or adjusted under 35 U.S.C. 154(b) by 0 days.

(21) Appl. No.: 09/331,232

(22) PCT Filed: Dec. 15, 1997

(86) PCT No.: PCT/SE97/02097

§ 371 Date: Sep. 10, 1999

§ 102(e) Date: Sep. 10, 1999

(87) PCT Pub. No.: WO98/26950

PCT Pub. Date: Jun. 25, 1998

(30) Foreign Application Priority Data

Dec. 19, 1996 (SE) .................................... 9604673

(51) Int. Cl.[7] .............................. B60K 17/35; F16D 3/10; F16D 43/00

(52) U.S. Cl. ......................... 192/20; 192/35; 192/103 R; 475/339

(58) Field of Search ................................ 192/54.52, 54.4, 192/103 R, 215, 226, 12 D, 20, 35; 475/339, 340, 341, 342, 154

(56) References Cited

U.S. PATENT DOCUMENTS

| | | | |
|---|---|---|---|
| 3,323,779 | * 6/1967 | Burnett | 192/215 X |
| 5,322,484 | * 6/1994 | Reuter | 192/215 X |
| 5,405,293 | * 4/1995 | Severinsson | 192/35 X |
| 5,469,950 | * 11/1995 | Lundstrom et al. | 192/103 F X |
| 5,720,375 | * 2/1998 | Maeda et al. | 192/35 |
| 5,810,141 | * 9/1998 | Organek et al. | 192/35 |
| 5,884,738 | * 3/1999 | Joslin et al. | 192/35 |
| 5,954,173 | * 9/1999 | Sakai et al. | 192/35 |

* cited by examiner

*Primary Examiner*—Rodney H Bonck
(74) *Attorney, Agent, or Firm*—James Ray & Associates

(57) ABSTRACT

A device for transmitting torque between two rotatable, coaxial shaft members (1, 2) contains a number of alternate clutch discs (5, 6) for counteracting differential rotational speed between the two shaft members. Planetary gear means (11, 15, 16–20) are connected to the first shaft means (1). A pressure plate (7) is connected to the second shaft member (2) and is axially displaceable against the clutch discs (5, 6) for their engagement. Transmission means in the form of rollers (10) are arranged between the gear means and the pressure plate for axially displacing the pressure plate against the clutch discs at a certain rotation differential between the gear means and the pressure plate. Electrical braking means (21–24) connected to the gear means can provide a force to the transmission means for its axial displacement.

20 Claims, 5 Drawing Sheets

Fig. 3
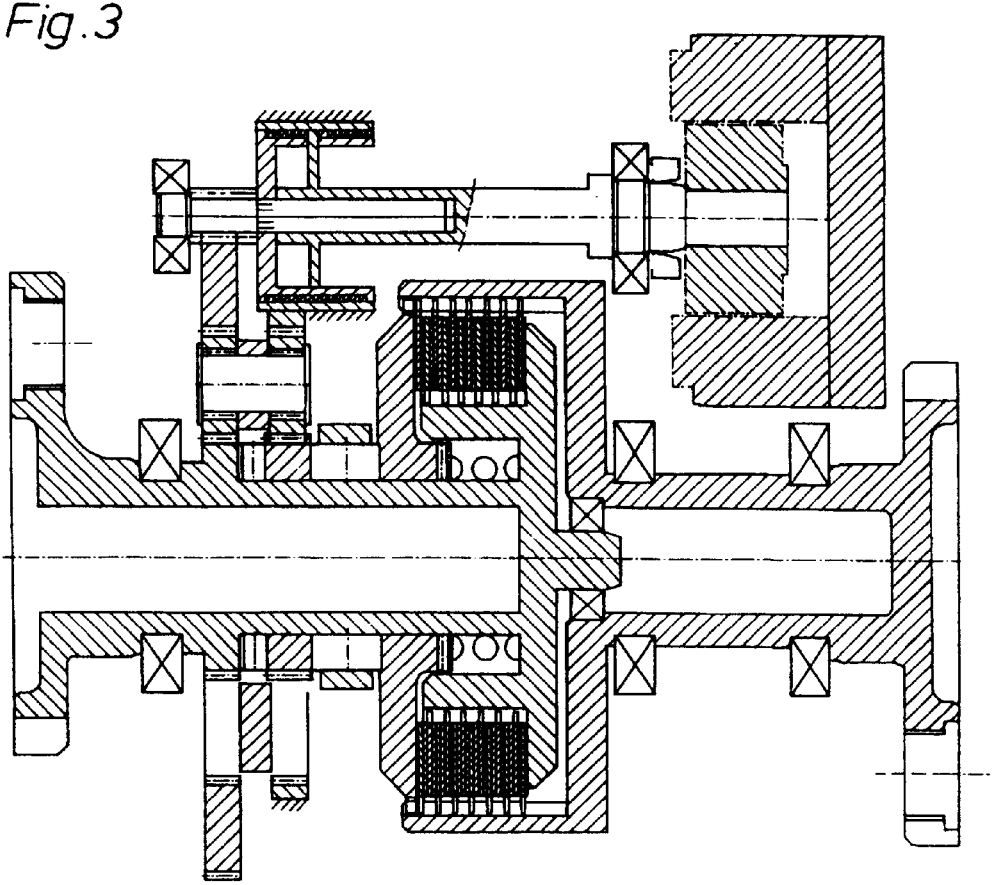
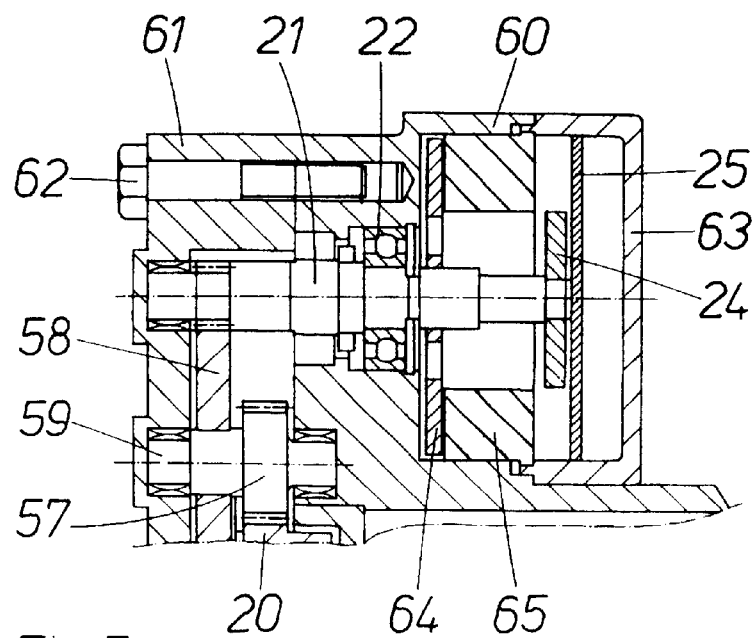
Fig. 7

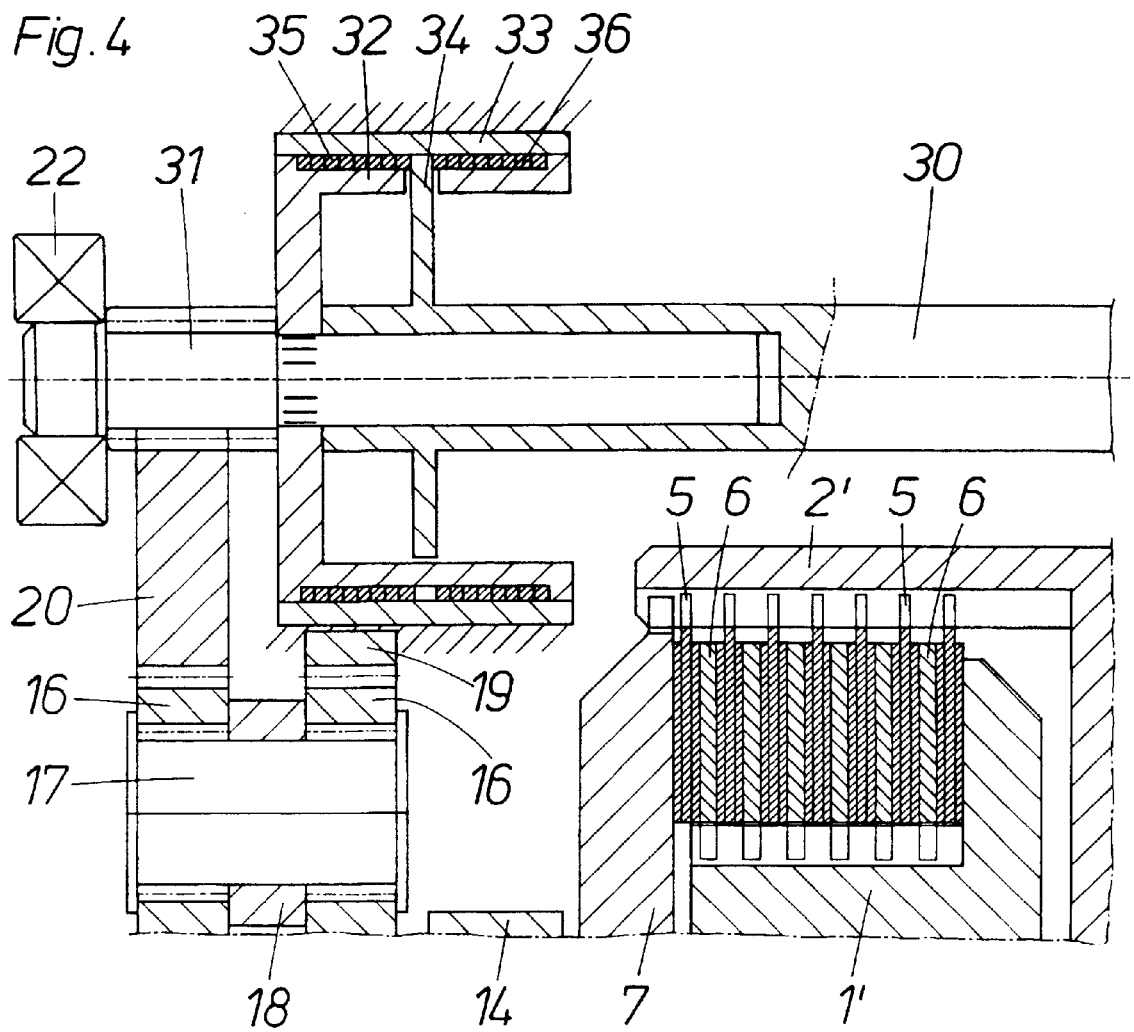

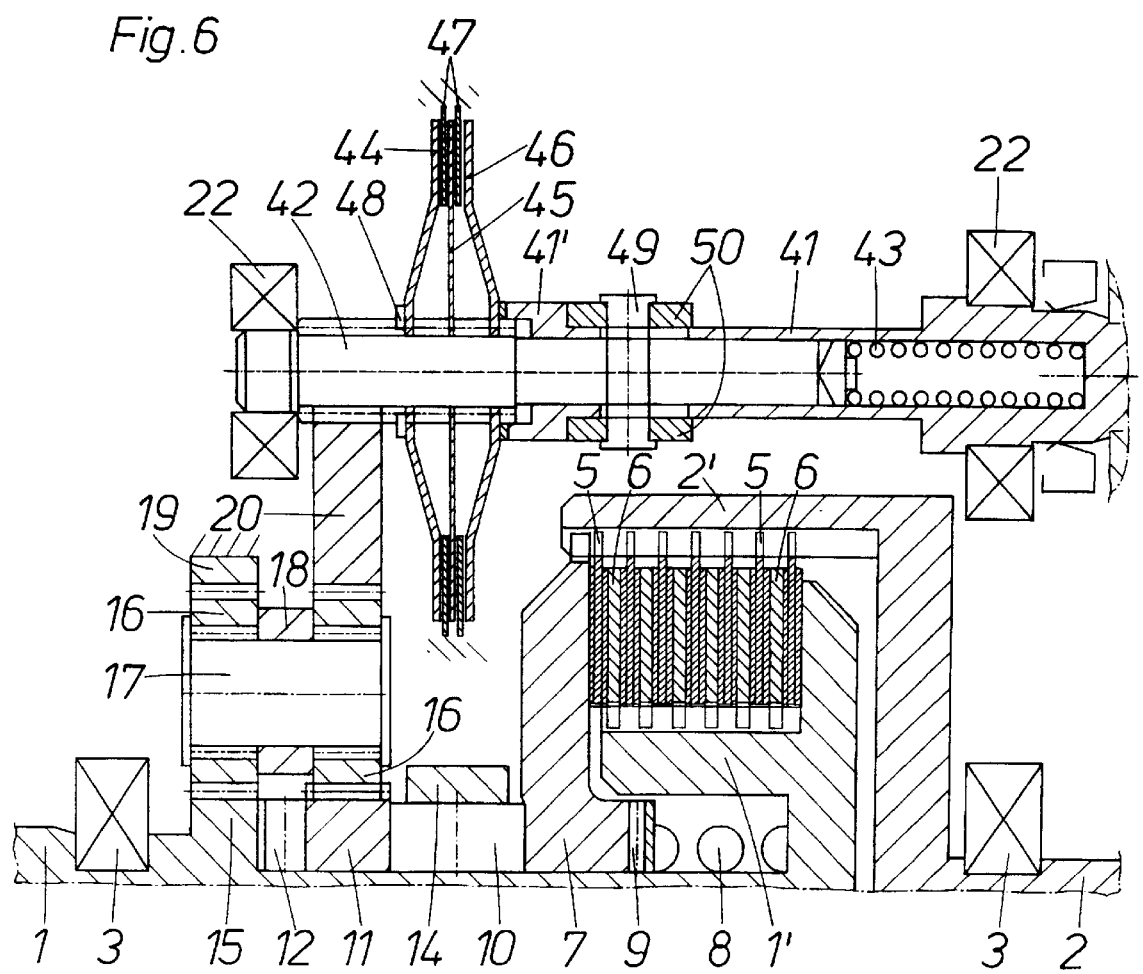

TORQUE TRANSMITTING DEVICE

TECHNICAL FIELD

The present invention relates to a device for transmitting torque between two rotatable, coaxial shaft members, the device containing a number of alternate clutch discs connected to the two shaft members and engageable to counteract differential rotational speed between the shaft members.

BACKGROUND OF THE INVENTION

Devices for transmitting torque between two rotatable shafts are known from numerous patent publications, one typical example being U.S. Pat. No. 5,469,950 from the same applicant. Here the two shafts are the output shafts of a vehicle differential mechanism. The device may accordingly in this case be called a differential brake. There may, however, be other instances when it is desired to counteract a certain rotational speed differential between two shafts, a typical example being the two shafts to the driven front and rear axle, respectively, of a four-wheel-drive vehicle.

There may be different techniques to obtain the counteracting of the rotational speed differential, but several of the known solutions rely on a hydraulic system. The device according to the patent mentioned above is one example hereof.

Hydraulic systems for the above purpose may be rather complicated and accordingly expensive to manufacture and service.

The control of different systems in a road vehicle is to a growing extent electrically performed, and different control systems often interact. The control signal to a device of the kind with which the present invention is concerned is most often electrical and is influenced by signals from other on-board systems. It would accordingly seem advantageous not to be forced to use a hydraulic system but rather an electro-mechanical system.

THE INVENTION

For obtaining an improved torque transmitting device of the kind defined above, means for counteracting said differential rotational speed between the shaft members may comprise braking means for braking rotational movement, the rotational velocity in the braking means being proportional to the rotational speed differential between the shaft members.

In this way both the rotational speed differential and the torque transmitted between the shaft members is controlled by means of rotational velocity in the braking means, which gives the possiblity for an improved control independent of internal factors in the device itself.

A practical device for accomplishing the above may according to the invention comprise gear means connected to the first shaft member, a pressure plate, which is connected to the second shaft member and is axially displaceable against the clutch discs for their engagement, transmission means between the gear means and the pressure plate for axially displacing the pressure plate against the clutch discs at a certain rotation differential between the gear means and the pressure plate, and braking means connected to the gear means for providing a force to the transmission means for its axial displacement.

In this device the gear means is preferably of the planetary type and comprises a gear wheel attached to the first shaft member and a corresponding gear wheel, which is rotatable on the first shaft member and engages the transmission means, sets of two planet wheels, which engage the two gear wheels and are arranged on a common axle of a planet holder, a fixed gear rim in engagement with one of the planet wheels, and a gear ring, with whose internal gears the other planet wheel is in engagement and which is in engagement with the braking means.

Further, the transmission means may preferably comprise rollers arranged in ramps between the pressure plate and the gear wheel rotatable on the first shaft means. At a relative rotation between the pressure plate and the gear wheel the roller-and-ramp-arrangement will result in an axial displacement.

For obtaining the necessary axial force in this transmission means a compression spring is arranged between the second shaft member and the pressure plate.

The advantage with electrical control and electrical actuation of the device can be obtained in that the braking means comprises an electrical brake consisting of a stator and a rotor on a brake shaft rotationally driven by the gear ring.

BRIEF DESCRIPTION OF THE DRAWINGS

The invention will be described in further detail below reference being made to the accompanying drawings, in which FIG. 3 is a section corresponding to FIG. 1 of a second embodiment of the invention, FIG. 4 is an enlarged portion of FIG. 3, FIG. 6 is an enlarged portion of FIG. 5, and FIG. 7 is a section through a portion of a modification of the first embodiment according to FIG. 1.

DETAILED DESCRIPTION OF PREFERRED EMBODIMENTS

Figure 1:
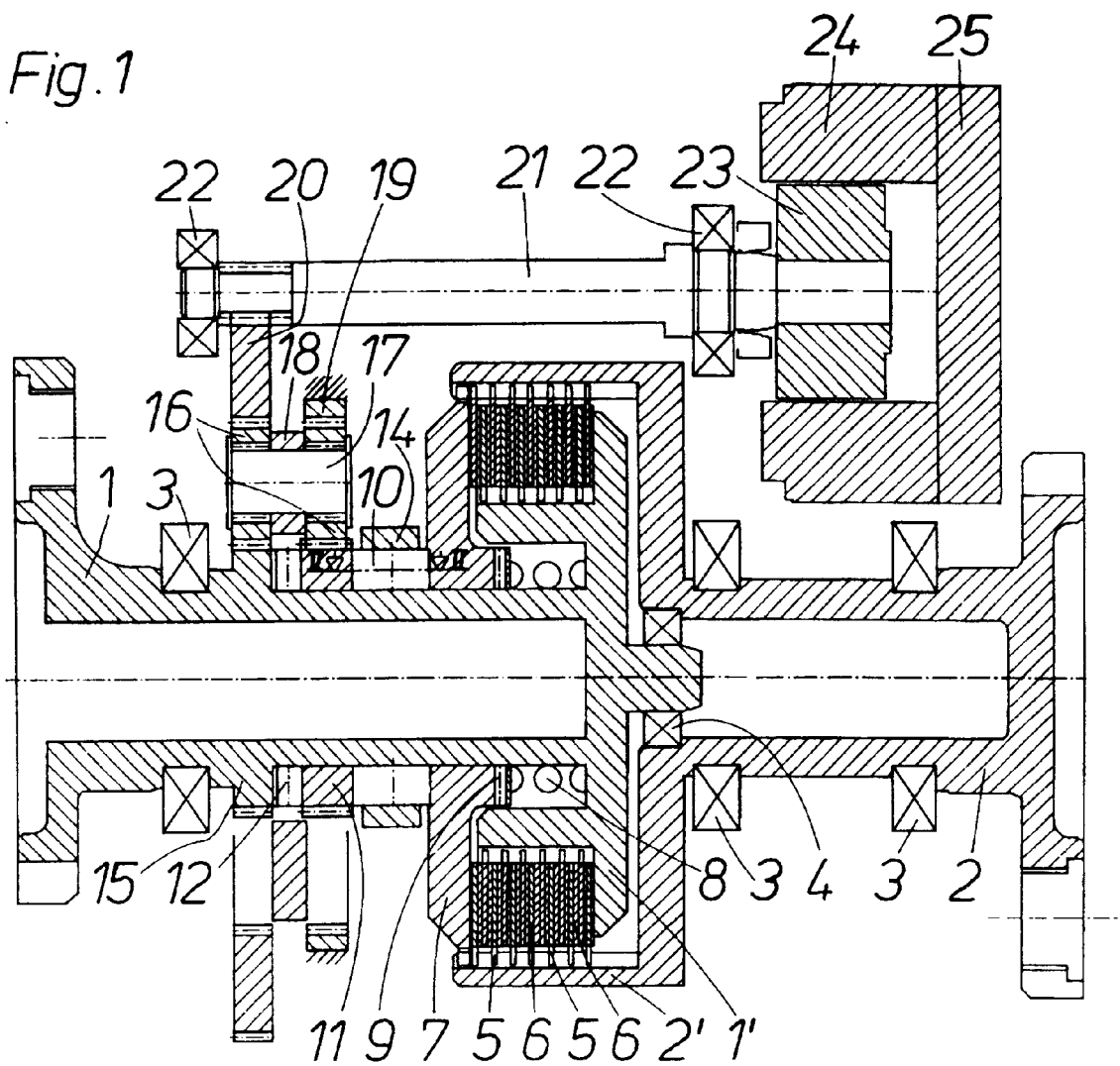
FIG. 1 is a somewhat schematical section through a first embodiment of the invention.

In a first embodiment shown in FIG. 1, two shaft members 1 and 2 are rotatably journalled by means of bearings 3 in a structure, which is not shown but for example may be mounted in a road vehicle. Also, the two shaft members are journalled in relation to each other by means of a bearing 4. The two shaft members 1 and 2 are to be connected to further parts (not shown), for example in said vehicle. Relative axial movements are not permitted between the two shaft members.

The shaft members 1 and 2 shall be freely rotatable relative to each other, if the rotation differential between them is comparatively low. If the rotation differential is higher or is increased over a certain limit, the shaft members shall be frictionally connected, so that further increase of the rotation differential is counteracted. The connection conditions shall be independent of the rotation direction and which member that rotates faster than the other.

The frictional connection is established by means of a number of alternate clutch discs or rings 5 and 6, which are splined to an outer surface of a generally sleeve-shaped part 1' of the first shaft member 1 to the left in the drawing and an inner surface of a generally sleeve-shaped part 2' of the second shaft member 2, respectively.

At its outer periphery a ring-shaped pressure plate 7 is in splines-engagement with the right shaft member 2 via its part 2' and is rotatable in relation to the left shaft member 1. A compression spring 8 acts from the left shaft member 1 on the pressure plate via an axial bearing 9. The force from the spring 8 also acts via the pressure plate 7 on rollers 10, a gear wheel 11 and an axial bearing 12 on the left shaft member 1.

Figure 2:
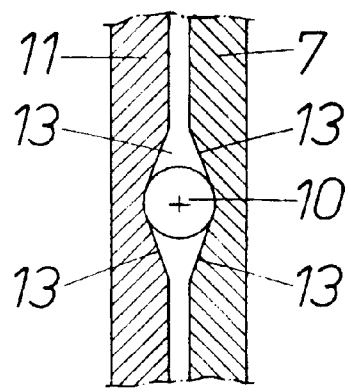
FIG. 2 is a section along the lines II—II in FIG. 1.

On their axial surfaces facing each other, the pressure plate 7 and the gear wheel 11 are provided with ramps 13, as schematically illustrated in FIG. 2. The number of ramps 13 evenly distributed on the periphery is two or more, corresponding to the number of rollers 10. These rollers 10 are held in proper positions by a roller cage 14.

From the illustration in FIG. 2 it is evident that the pressure plate 7 and the gear wheel 11 are brought apart, when they are turned in relation to each other, so that each roller 10 climbs the ramps 13.

Due to the force from the spring 8 and the inclination angle of the ramps 13 a certain torque will be transmitted to the gear wheel 11 at a rotation of the pressure plate 7. If this torque is exceeded, so that the pressure plate 7 and the gear wheel 11 are turned in relation to each other, the rollers 10 will enter the ramps 13 displacing the pressure plate 7 axially to the right in the drawing, so that the clutch discs 5 and 6 are engaged frictionally and connect the shaft members 1 and 2.

As already stated, a gear wheel 11 is movably arranged on the left shaft member 1. A further, fixed gear wheel 15 is provided on the left shaft member itself, preferably but not necessarily adjacent to the movable gear wheel 11. A differential planetary gearing is arranged around the two gear wheels 11 and 15. This planetary gearing has sets of two planet wheels 16 in engagement with the two gear wheels 11 and 15 and arranged on a common axle 17 of a planet holder 18. One of the planet wheels 16 is in engagement with a fixed gear rim 19 and the other one with the internal gears of a gear ring 20.

The design and dimensioning of the planetary gearing is such that the gear ring 20 will not be imparted any motion, if the gear wheels 11 and 15 rotate with the same speed or do not rotate.

The external gears of the gear ring 20 are in engagement with gears of a brake shaft 21, which is journalled by means of bearings 22 in the same structure as the arrangement so far described.

The brake shaft 21 is provided with a brake rotor 23 cooperating with a brake stator 24 to form an electrically actuated brake 23, 24. An electronic control box 25 may be mounted to the fixed brake stator 24.

The rotation differential may be supervised in the brake 23, 24 or possibly directly on the shaft members 1 and 2. The technique for sensing and transmitting the rotation differential is state of the art. It may be sensed at the brake rotor 23 or the brake stator 24 or at any suitable location by a rotation transmitter.

The function of the described device is as follows:

a) The shaft members 1 and 2 rotate with the same speed.

The gear wheel 15 is integral with and thus rotates with the same speed as the left shaft member 1. The pressure plate 7 rotates with the same speed as the right shaft member 2. Due to the torque exerted by the spring 8 on the gear wheel 11 also the latter will rotate with the same speed as the shaft member 2. As the gear wheels 11 and 15 rotate with the same speed, the gear ring 20 will remain stationary. No activation of the clutch discs 5 and 6 will occur.

b) The shaft members 1 and 2 rotate with a rotation differential under the limit value.

Again, the gear wheel 15 rotates with the same rotational speed as the left shaft member 1, whereas the pressure plate 7 rotates with the same speed as the right shaft member 2. Due to the torque exerted by the spring 8 on the gear wheel 11 also the latter rotates with the same speed as the right shaft member 2. This means that the two gear wheels 11 and 15 now rotate with different speeds, so that the gear ring 20 and the brake shaft 21 rotate. However, as the rotation differential is below the set limit, the electrically actuated brake 23, 24 is not activated. No activation of the clutch discs 5 and 6 will accordingly occur.

c) The shaft members 1 and 2 rotate with a higher rotation differential.

As earlier, the gear wheel 15 rotates with the left shaft member 1 and the pressure plate 7 with the right shaft member 2. The gear wheel 11 also rotates with the same speed as the right shaft member 2 due to the torque exerted by the spring 8. The gear wheels 11 and 15 rotate with different speeds, so that the gear ring 20 and the brake shaft 21 rotate. When the rotation differential is higher than a predetermined level, the electrically activated brake 23, 24 is actuated. When the gear ring 20 is braked via the brake shaft 21, the gear wheel 11 is turned in relation to the pressure plate 7, so that the clutch discs 5 and 6 engage and counteract a further increase of the rotation differential. This engagement of the clutch discs 5 and 6 creates a further torque on the gear wheel 11. This further torque is proportional to the torque which the clutch discs 5 and 6 have to transfer for preventing the rotation differential from increasing. The total torque on the gear wheel 11 is in this case the sum of the two mentioned torques.

Figure 5:
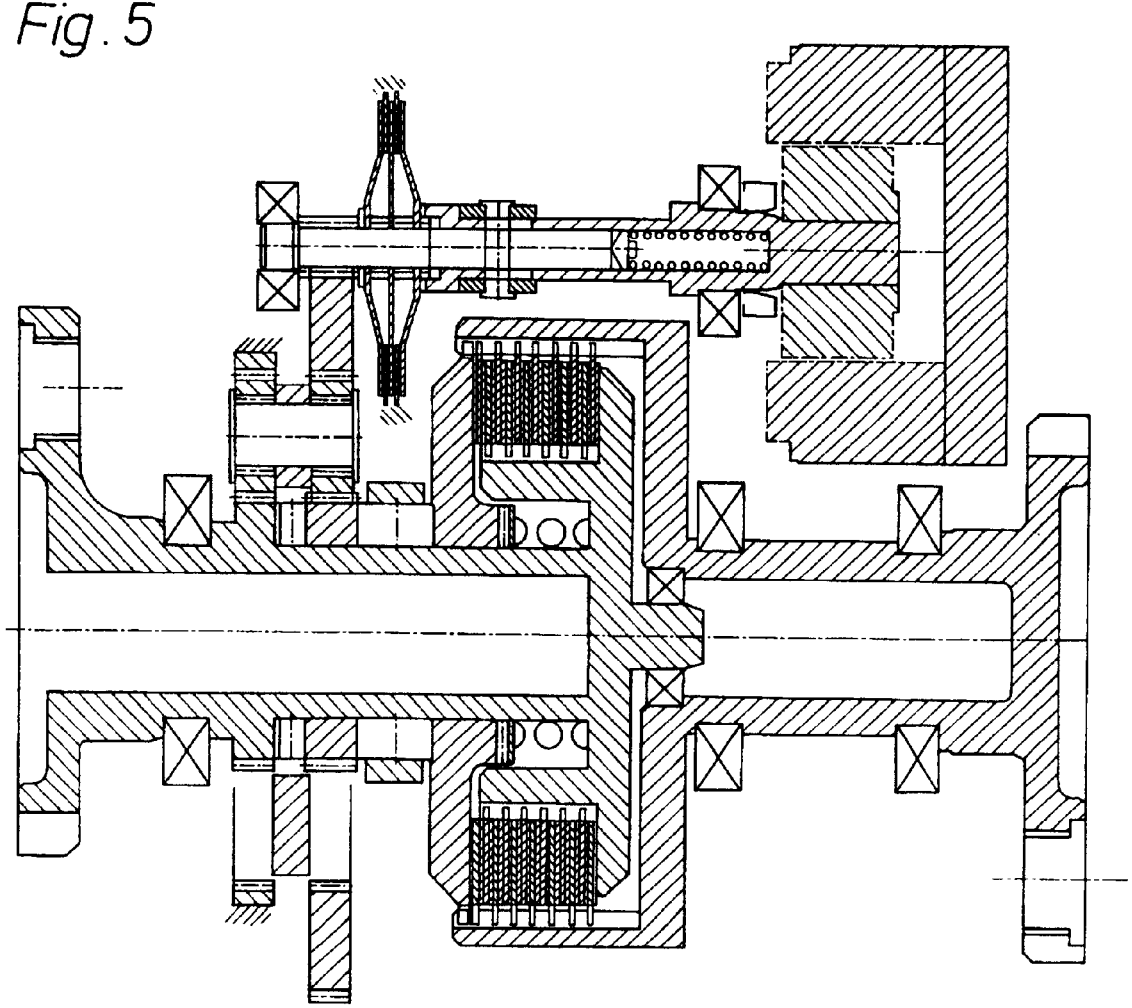
FIG. 5 is a section corresponding to FIG. 1 of a third embodiment of the invention.

The first embodiment of the invention has been described with reference to FIGS. 1 and 2. A second embodiment is shown in FIG. 3 with portions there of enlarged in FIG. 4 and a third embodiment in FIG. 5 with portions thereof enlarged in FIG. 6. With the exception of differences relating to the brake mechanism, being provided with a kind of brake servo as detailed below, the three embodiments are completely similar, and reference may accordingly be made to the enlarged illustrations of FIG. 4 and especially FIG. 6 for a better understanding. (Please note, however, that in the third embodiment of FIGS. 5 and 6 there is a slight reorganization in the planetary gearing without any functional implication.) In the three embodiments similar parts are provided with the same reference numerals. For the sake of simplicity, FIGS. 3 and 5 are not provided with reference numerals.

The second embodiment shown in its entirety in FIG. 3 and enlarged in its essential portions in FIG. 4 differs from the first embodiment in the design of the electrically actuated brake.

A first part of the brake shaft ending with the rotor 23 is here provided with the reference numeral 30, whereas a second part thereof ending with the gear wheel in engagement with the gear ring 20 and rotationally extending into the first brake shaft part 30 is provided with the reference numeral 31. A generally cylindrical sleeve 32 is attached to the second brake shaft part 31 for rotation therewith. A fixed sleeve 33 surrounds the rotatable sleeve 32. The first brake shaft part 30 is provided with radial means 34, which extend into the rotatable sleeve 32 in one or several circumferential slits therein. In engagement with the radial means 34 are respective ends of two oppositely wound locking springs 35 and 36, which in their rest positions are not in contact with the fixed sleeve 33. These locking springs 35 and 36 are arranged in suitably dimensioned recesses in the rotatable sleeve 32.

By this design the two brake shaft parts 30 and 31 can rotate freely together as a unit, when no brake torque is applied. When however a brake torque is applied to the first part 30 (in either direction) from the electrical brake 23, 24 (FIG. 1), one of the locking springs 35 and 36 will be expanded against the fixed sleeve 33, applying a greater braking torque on the second brake shaft part 31 than that applied by the brake 23, 24. The arrangement accordingly function as a servo device for the brake 23, 24, which thus may be of smaller dimensions than otherwise without impairing the function of the brake.

The embodiment shown in FIGS. 5 and 6 is provided with a corresponding servo device with a slightly different design. Also in this embodiment the brake shaft is divided into two parts, a first part 41 ending in the rotor 23 and a second part 42 ending in the gear wheel in engagement with the gear ring 20. As in the former case, the second brake shaft part 42 extends into the first brake shaft part 41. For reasons to be explained, there is a compression spring 43 exerting a force to the left in the drawing on the second brake shaft part 42.

Splined to the second brake shaft part 42 are two or more, in the shown exemple three, discs 44, 45 and 46, cooperating at their radially outer regions with fixed friction rings 47. The first disc 44 to the left in the drawing is supported to the left by a locking ring 48 on the second brake shaft part 42, whereas the third disc 46 to the right in the drawing may be actuated to the left by a collar 41' on the first brake shaft part 41. The second disc 45 is arranged between the two others and between the two friction rings 47. In a non-actuated position there is no engagement between the discs 44–46 and the friction rings 47.

A pin 49 extends through the second brake shaft part 42 and through slits in the first brake shaft part 41 for allowing certain angular and axial movements between the two shaft parts. Circular rings 50 are provided at the ends of the pin 49. These rings are adapted to cooperate with ramps on the side of the collar 41' facing from the third disc 46, so that the first brake shaft part 41 is transferred slightly to the left in the drawing in relation to the second brake shaft part 42 and thus the three discs 44–46 are brought into braking or torque transmitting engagement with the fixed friction rings 47, independently of the rotation direction. The purpose of the spring 43 is to provide a certain prestress to the arrangement for ensuring a play free function.

In a corresponding manner as the arrangement of FIG. 4, this arrangement will provide a servo function for the electrical brake 23, 24, which accordingly may be of smaller size than otherwise.

FIG. 7 is a section through an upper portion of a modified version of the first embodiment according to FIG. 1, and the same numerals have been used for corresponding, although not identical parts. Especially the following parts may be recognized: the gear ring 20, the brake shaft 21, the bearing 22 and the electronic control box 25, which here is in the form of an electronic card.

In this modified version there is a gear step-up between the gear ring 20 and the brake shaft 21 in the form of gear wheels 57 and 58 on a common shaft 59, the smaller gear wheel 57 engaging the gear ring 20 and the larger gear wheel 58 engaging the brake shaft 21. The gear step-up gives a higher rotational speed to the brake shaft with a resulting higher signal resolution and provides a greater design flexibility.

The different parts are arranged in a housing, which has not been shown for the other embodiments and comprises a main part 60, a cover 61 connected thereto by means of screws 62 (of which one is shown in FIG. 7) and a lid 63.

The brake shaft 21 has a means for providing signals indicative of the rotational speed of the brake shaft and thus the rotation differential in the device, preferably a pulse disc 24 providing pulses to the neighboring electronic card 25.

The brake shaft 21 is further provided with a brake disc 64, constituting one part of an electromagnetic brake, whose second part is a fixed, preferably cylindrical electromagnet 65. When the sensed rotation differential exceedes a predetermined value, the electromagnet 65 will be energized for frictionally braking the brake disc 64 and thus the brake shaft 21.

The design constitutes a rotationally fedback electromagnetic friction brake. The rotational speed of the brake shaft or in other words the rotational differential is continuously monitored. The torque transmitting device is controlled in that the current in the electromagnetic brake is varied in such a way that the rotational speed of the brake disc is kept within predetermined limits. The torque transmitted by the overall device is proportional to the current in the electromagnetic brake.

Modifications are possible within the scope of the appended claims. As an example the brake may be an eddy-current brake.

Summarizing, a device according to the invention has several advantages over presently known hydraulic devices for the same purpose:

no control sub-system is required;

absolute control over the rotational speed differential is provided;

advanced control of the rotational speed differential is possible;

a vehicle equipped with a device according to the invention may be towed without difficulty;

the function of the device is symmetrical with regard to the rotation direction, the clutch disc forces are not transmitted to any neighboring structure, which contributes to keeping the weight down, reports can automatically be given to other systems in the vehicle regarding the rotational difference, the torque in the device, and the direction of the rotational differential (or in other words an indication of which of the shaft members that rotates faster than the other), the torque transmission device can be kept locked for an indefinite period of time, i e the rotational differential is zero, the brake and electronic portion or module does not contain moving parts (except the brake shaft).

What is claimed is:

1. A device for transmitting torque between a first rotatable coaxial shaft member and a second rotatable coaxial shaft member, the device including a number of alternate clutch discs connected to the first and second shaft members and engageable to counteract differential rotational speed between the first and second shaft members, and comprising gear means connected to the first shaft member;

a pressure plate, which is connected to the second shaft member and is axially displaceable against the clutch discs for their engagement;

transmission means between the gear means and the pressure plate for axially displacing the pressure plate against the clutch discs at a certain rotation differential between the gear means and the pressure plate, and braking means for braking rotational movement, connected to the gear means for providing a braking force to the transmission means for its axial displacement, the rotational velocity in the braking means being proportional to the rotational speed differential between the first and second shaft members.

2. A device according to claim 1, wherein the gear means is of the planetary type and comprises:

a gear wheel attached to the first shaft member and a corresponding gear wheel, which is rotatable on the first shaft member and engages the transmission means;

sets of two planet wheels, which engage the two gear wheels and are arranged on a common axle of a planet holder;

a fixed gear rim in engagement with one of the planet wheels, and a gear ring, with whose internal gears the other planet wheel is in engagement and which is in engagement with the braking means.

3. A device according to claim 2, wherein the transmission means comprises rollers arranged in ramps between the pressure plate and the gear wheel rotatable on the first shaft means.

4. A device according to claim 3, additionally comprising means for sensing the rotation differential between the first and second shaft members.

5. A device according to claim 2, wherein the braking means comprises an electrical brake including a stator and a rotor on a brake shaft rotationally driven by the gear ring.

6. A device according to claim 5, additionally comprising means for sensing the rotation differential between the first and second shaft members.

7. A device according to claim 2, wherein the braking means comprises an electromagnetic brake including a fixed electromagnet and a brake disc, which is arranged on a brake shaft rotationally driven by the gear ring and is to be frictionally braked by the electromagnet.

8. A device according to claim 7, additionally comprising means for sensing the rotation differential between the first and second shaft members.

9. A device according to claim 2, additionally comprising means for sensing the rotation differential between the first and second shaft members.

10. A device according to claim 1, wherein the transmission means comprises rollers arranged in ramps between the pressure plate and the gear wheel rotatable on the first shaft member.

11. A device according to claim 10, wherein a compression spring is arranged between the second shaft member and the pressure plate for applying an axial force on the rollers and the gear wheel, which is rotatable on an axial bearing on a shoulder of the first shaft member.

12. A device according to claim 11, additionally comprising means for sensing the rotation differential between the first and second shaft members.

13. A device according to claim 10, additionally comprising means for sensing the rotation differential between the first and second shaft members.

14. A device according to claim 1, wherein the braking means comprises an electrical brake consisting of a stator and a rotor on a brake shaft rotationally driven by the gear ring.

15. A device according to claim 14, additionally comprising means for accomplishing a servo action for the electrical brake.

16. A device according to claim 14, additionally comprising means for sensing the rotation differential between the first and second shaft members.

17. A device according to claim 1, wherein the braking means comprises an electromagnetic brake consisting of a fixed electromagnet and a brake disc, which is arranged on a brake shaft rotationally driven by the gear ring and is to be frictionally braked by the electromagnet.

18. A device according to claim 17, additionally comprising means for sensing the rotation differential between the first and second shaft members.

19. A device according to claim 1, additionally comprising means for sensing the rotation differential between the first and second shaft members.

20. A device according to claim 1, additionally comprising means for sensing the rotation differential between the first and second shaft members.

* * * * *